US010580242B2

(12) United States Patent
Ray et al.

(10) Patent No.: US 10,580,242 B2
(45) Date of Patent: Mar. 3, 2020

(54) ASSET MANAGEMENT SYSTEM UTILIZING A MOBILE APPLICATION

(71) Applicant: Marcon International Inc, Harrisburg, NC (US)

(72) Inventors: Travis Ray, Midland, NC (US); Ric Stone, Weddington, NC (US)

(73) Assignee: Macron International, Inc., Harrisburg, NC (US)

( * ) Notice: Subject to any disclaimer, the term of this patent is extended or adjusted under 35 U.S.C. 154(b) by 0 days.

(21) Appl. No.: 15/875,430

(22) Filed: Jan. 19, 2018

(65) Prior Publication Data

US 2018/0211465 A1     Jul. 26, 2018

Related U.S. Application Data

(60) Provisional application No. 62/448,697, filed on Jan. 20, 2017.

(51) Int. Cl.
| | |
|---|---|
| *G07C 9/00* | (2020.01) |
| *G06K 7/14* | (2006.01) |
| *H04W 12/06* | (2009.01) |
| *G07B 15/00* | (2011.01) |
| *G06Q 30/06* | (2012.01) |
| *H04W 12/00* | (2009.01) |

(52) U.S. Cl.
CPC ....... *G07C 9/00912* (2013.01); *G06K 7/1404* (2013.01); *G07B 15/00* (2013.01); *G07C 9/00571* (2013.01); *H04W 12/06* (2013.01); *G06Q 30/0645* (2013.01); *H04W 12/00522* (2019.01)

(58) Field of Classification Search
CPC ... G07C 9/00; G07C 9/00007; G07C 9/00031
See application file for complete search history.

(56) References Cited

U.S. PATENT DOCUMENTS

| | | |
|---|---|---|
| 5,020,347 A | 6/1991 | Logan |
| 5,505,066 A | 4/1996 | Baucom |
| 6,505,754 B1 | 1/2003 | Kenny et al. |
| 7,654,853 B2 | 2/2010 | Smilie et al. |
| 7,656,272 B2 | 2/2010 | Baucom |
| 7,656,867 B2 | 2/2010 | Herbert |
| 7,852,214 B2 | 12/2010 | Smilie |
| 8,477,009 B2 | 7/2013 | Baucom |
| 8,661,864 B1 | 3/2014 | Guessford |

(Continued)

*Primary Examiner* — Carlos Garcia
(74) *Attorney, Agent, or Firm* — Clements Bernard Walker; Christopher L. Bernard

(57) ABSTRACT

An asset management system, comprising: a remote storage device coupled to a controller collectively configured to selectively retain an asset and selectively release the asset to an authorized user; and a mobile device configured to execute a mobile application in communication with one or more of the remote storage device and the coupled controller via one or more networks, wherein the mobile application is operable for directing operation of the one or more of the remote storage device and the coupled controller. The mobile device comprises a QR scanner operable for scanning a QR code and subsequently authorizing the authorized user. The mobile device also comprises a barcode scanner operable for scanning a barcode associated with the asset or a related asset.

12 Claims, 4 Drawing Sheets

(56) References Cited

U.S. PATENT DOCUMENTS

| | | | |
|---|---|---|---|
| 8,768,565 B2* | 7/2014 | Jefferies | G07B 15/00 |
| | | | 701/29.6 |
| 9,911,255 B2* | 3/2018 | Lee | G07C 9/00007 |
| 9,947,153 B2* | 4/2018 | Bergerhoff | B60R 25/04 |
| 10,043,151 B1* | 8/2018 | Zhu | G06Q 10/0836 |
| 2005/0068178 A1* | 3/2005 | Lee | G06Q 10/08 |
| | | | 340/569 |
| 2007/0043682 A1* | 2/2007 | Drapkin | G06Q 20/3829 |
| | | | 705/71 |
| 2007/0273534 A1* | 11/2007 | McGinn | G06Q 30/02 |
| | | | 340/572.8 |
| 2008/0107271 A1* | 5/2008 | Mergen | H04L 9/30 |
| | | | 380/278 |
| 2009/0179735 A1* | 7/2009 | Van Rysselberghe | |
| | | | A47G 29/141 |
| | | | 340/5.73 |
| 2014/0169564 A1* | 6/2014 | Gautama | G07C 9/00309 |
| | | | 380/270 |
| 2014/0354398 A1* | 12/2014 | Boday | G07C 9/00912 |
| | | | 340/5.2 |
| 2015/0145647 A1* | 5/2015 | Engel-Dahan | G07C 9/00571 |
| | | | 340/5.61 |
| 2015/0222604 A1* | 8/2015 | Ylonen | H04L 63/062 |
| | | | 713/171 |
| 2016/0053526 A1* | 2/2016 | Dittrich | E05G 1/04 |
| | | | 109/38 |
| 2016/0098870 A1* | 4/2016 | Bergerhoff | G07C 9/00007 |
| | | | 340/5.61 |
| 2016/0319568 A1* | 11/2016 | Kristensen | E05B 19/0005 |
| 2017/0330144 A1* | 11/2017 | Wakim | G01C 21/34 |
| 2018/0154867 A1* | 6/2018 | Golduber | G06Q 10/02 |
| 2018/0211465 A1* | 7/2018 | Ray | G07C 9/00912 |
| 2018/0349838 A1* | 12/2018 | Rivera | G06K 7/10297 |

\* cited by examiner

ASSET MANAGEMENT SYSTEM UTILIZING A MOBILE APPLICATION

CROSS-REFERENCE TO RELATED APPLICATION

The present patent application/patent claims the benefit of priority of U.S. Provisional Patent Application No. 62/448,697, filed on Jan. 20, 2017, and entitled "KEY MANAGEMENT SYSTEM UTILIZING A MOBILE APPLICATION," the contents of which are incorporated in full by reference herein.

FIELD OF THE INVENTION

The present invention relates generally to an asset management system for safeguarding and providing selective access to a vehicle or property key/key fob or the like. More specifically, the present invention relates to an asset management system for safeguarding and providing selective access to a vehicle or property key/key fob or the like utilizing a mobile application.

BACKGROUND OF THE INVENTION

In various vehicle dealerships/rental agencies/repair shops, real estate offices/apartment complexes, etc. it is desirable to safeguard vehicle or property keys/key fobs and provide selective access to personnel such that a vehicle can be test driven, sold, rented, repaired, etc. or a property can be toured, sold, rented, etc. A number of conventional asset management systems exist for these and other purposes, allowing assets to be accounted for and tracked.

For example, U.S. Pat. No. 5,505,066 provides an apparatus for alternately retaining a selected one of a pair of keys and releasing the other one of the pair of keys. The retained key cannot be released until the other key is again disposed in a retained position. The apparatus includes a base plate having a pair of key receptacles, a slider assembly slidably mounted on the base plate, a visitor key having a pinion gear and a home key. The slider assembly includes a pair of key retaining slots for respectively retaining each key and a rack for driving engagement by the visitor key pinion gear for effecting sliding movement of the slider assembly in response to rotation of the visitor key pinion gear. A conventional key can be secured to the home key to control use of the conventional key through the selected release and retention of the visitor key and the home key.

U.S. Pat. No. 5,020,347 also provides an apparatus for alternately retaining a selected one of a pair of keys and releasing the other one of the pair of keys. The retained key cannot be released until the other key is again disposed in a retained position. The apparatus includes a base plate having a pair of key receptacles, a slider member slidably mounted on the base plate, a visitor key having a pinion gear and a home key. The slider member includes a pair of key retaining slots for respectively retaining each key and a rack for driving engagement by the visitor key pinion gear for effecting sliding movement of the slider member in response to rotation of the visitor key pinion gear. A conventional key can be secured to the home key to control use of the conventional key through the selected release and retention of the visitor key and the home key.

U.S. Pat. No. 7,656,272 provides a keyless management system for automating selective access to a lockable device and a method for selectively granting access. The system and method include the lockable device coupled to and secured by a security assembly; a processor remotely located from the device executing one or more algorithms operable for identifying a user, authorizing a predetermined level of command control based upon the identity of the user, receiving a command from the user to provide access to the device to at least one of the users and a third party, and translating the command into a form that may be received by the security assembly; a communications channel operable for communicating the translated command to the security assembly; and a controller proximately located to the device executing one or more algorithms operable for actuating the security assembly in response to the translated command, thereby providing access to the device to at least one of the users and a third party.

U.S. Pat. No. 6,505,754 provides an apparatus for automated key retrieval and deposit includes a housing and a key storage rack assembly positioned within the housing. The automated key retrieval and deposit apparatus also includes a key holder for holding a key to be retrieved positioned on the key storage rack, and a key holder actuating mechanism operatively connected to the key holder, for actuating the key holder between an extended position and a retracted position. The automated key retrieval and deposit apparatus further includes a cover pivotally connected to the key storage rack and actuatable between a closed position and an open position, wherein the cover, in the closed position, exerts a force on the keyholder to retain the key on the key holder.

U.S. Pat. No. 7,656,867 provides a serial bus identification circuit for a module that enables a microcontroller or microprocessor to identify one or many modules, each having an iButton digital device. The invention enables electronic activating and identifying the digital device amongst a plurality of similar devices. Each digital device has a unique digital registration number, and is an element of a module. In addition to the digital device, the module has a dual addressable switch component having a first switch and second switch, where the dual addressable switch component has a unique digital address; a light emitting source; and a source of electrical power. The dual addressable switch component and the unique digital device are in electrical communication with the serial data bus, and can be added as modules. When the first switch of the unique addressable component is closed, the digital device can be accessed, and the unique digital registration number can be down loaded and correlated to the dual addressable switch component. The second switch of the unique addressable component can be closed activating the light emitting source utilizing the source of electrical power. The light emitting source provides an identifying position signal for the device.

U.S. Pat. No. 7,852,214 provides an electronic circuit for detecting, identifying, and/or activating a digital device, including a touch-and-hold connector configured to hold an object of interest, the digital device coupled to the touch-and-hold connector, for example, wherein the digital device has a unique digital registration number, a microcontroller that reads the unique digital registration number of the digital device, a storage receptacle configured to selectively receive the touch-and-hold connector, a light-emitting source coupled to the storage receptacle and associated with the touch-and-hold connector, and an electrical power source.

U.S. Pat. No. 7,654,853 also provides an electronic circuit for detecting, identifying, and/or activating a digital device, including a touch-and-hold connector configured to hold an object of interest, the digital device coupled to the touch-and-hold connector, for example, wherein the digital device has a unique digital registration number, a microcontroller that reads the unique digital registration number of the digital device, a storage receptacle configured to selectively receive the touch-and-hold connector, a light-emitting source coupled to the storage receptacle and associated with the touch-and-hold connector, and an electrical power source. Further including, an apparatus for releasably securing a digital device to a touch-and-hold connector including a digital device having a unique digital registration number with a first end and a second end, at least one prong located on the first end of the digital device, a touch-and-hold connector having a top portion forming a lip and at least one opening located within the lip for receiving the at least one prong of the digital device, wherein the prong of the digital device is received with the at least one opening within the lip, whereby the digital device is rotated into a position so that the prong is in a spaced apart relationship with the at least one opening forming a releasably secure arrangement between the digital device and touch-and-hold connector.

U.S. Pat. No. 8,477,009 provides an automated asset management and security system for providing selective authorized access to an asset disposed within or associated with a remotely located lockable device, including: a control console, including: a processor executing one or more algorithms operable for identifying a user, authorizing a predetermined level of access based upon the identity of the user, receiving a command from the user to provide access to the asset disposed within or associated with the remotely located lockable device, and generating a corresponding command for the lockable device; and a communications channel for delivering the corresponding command to the lockable device; wherein the lockable device includes: a controller having a unique address executing one or more algorithms for implementing the corresponding command; and an actuation mechanism operable for selectively providing access to the asset disposed within or associated with the lockable device responsive to the corresponding command.

Finally, U.S. Pat. No. 8,661,864 provides an asset retention system, comprising: an elongate housing configured to receive a plurality of home keys and a visitor key; and an elongate slider coupled to the elongate housing and configured to selectively retain and release the plurality of home keys and the visitor key; wherein the elongate slider comprises a plurality of keyed holes corresponding to the plurality of home keys; wherein the plurality of keyed holes each comprise a narrowed portion configured to retain an associated home key when the elongate slider is translated in a first direction and a widened portion configured to release the associated home key when the elongate slider is translated in a second direction; and wherein the plurality of home keys are selectively retained and released simultaneously. The elongate housing and elongate slider are disposed in a cabinet. Each of the plurality of home keys is coupled to an asset.

What is still needed in the art, however, is an improved asset management system for safeguarding and providing selective access to a vehicle or property key/key fob or the like utilizing a mobile application.

BRIEF SUMMARY OF THE INVENTION

Thus, in various exemplary embodiments, the present invention provides an asset management system for safeguarding and providing selective access to a vehicle or property key/key fob or the like utilizing a mobile application.

In one exemplary embodiment, the present invention provides an asset management system, comprising: a remote storage device coupled to a controller collectively configured to selectively retain an asset and selectively release the asset to an authorized user; and a mobile device configured to execute a mobile application in communication with one or more of the remote storage device and the coupled controller via one or more networks, wherein the mobile application is operable for directing operation of the one or more of the remote storage device and the coupled controller. The mobile application is operable for indicating the presence of the asset in the remote storage device to the authorized user. The mobile application is operable for directing the remote storage device to release the asset to the authorized user. The mobile application is operable for allowing the authorized user to reserve release of the asset to the authorized user at a future time. The mobile application is operable for informing the authorized user of an identity of another authorized user that has already removed the asset from the remote storage device. The mobile application is operable for messaging the authorized user to inform the authorized user that another authorized user has requested access to the asset from the remote storage device. The mobile application is operable for providing the authorized user with information related to the asset or a related asset. The mobile device comprises a QR scanner operable for scanning a QR code and subsequently authorizing the authorized user. The mobile device also comprises a barcode scanner operable for scanning a barcode associated with the asset or a related asset. Optionally, the asset comprises one or more of a key, a key fob, a vehicle, and a property.

In another exemplary embodiment, the present invention provides an asset management method, comprising: providing a remote storage device coupled to a controller collectively configured to selectively retain an asset and selectively release the asset to an authorized user; and providing a mobile device configured to execute a mobile application in communication with one or more of the remote storage device and the coupled controller via one or more networks, wherein the mobile application is operable for directing operation of the one or more of the remote storage device and the coupled controller. The mobile application is operable for indicating the presence of the asset in the remote storage device to the authorized user. The mobile application is operable for directing the remote storage device to release the asset to the authorized user. The mobile application is operable for allowing the authorized user to reserve release of the asset to the authorized user at a future time. The mobile application is operable for informing the authorized user of an identity of another authorized user that has already removed the asset from the remote storage device. The mobile application is operable for messaging the authorized user to inform the authorized user that another authorized user has requested access to the asset from the remote storage device. The mobile application is operable for providing the authorized user with information related to the asset or a related asset. The mobile device comprises a QR scanner operable for scanning a QR code and subsequently authorizing the authorized user. The mobile device also comprises a barcode scanner operable for scanning a barcode associated with the asset or a related asset. Optionally, the asset comprises one or more of a key, a key fob, a vehicle, and a property.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
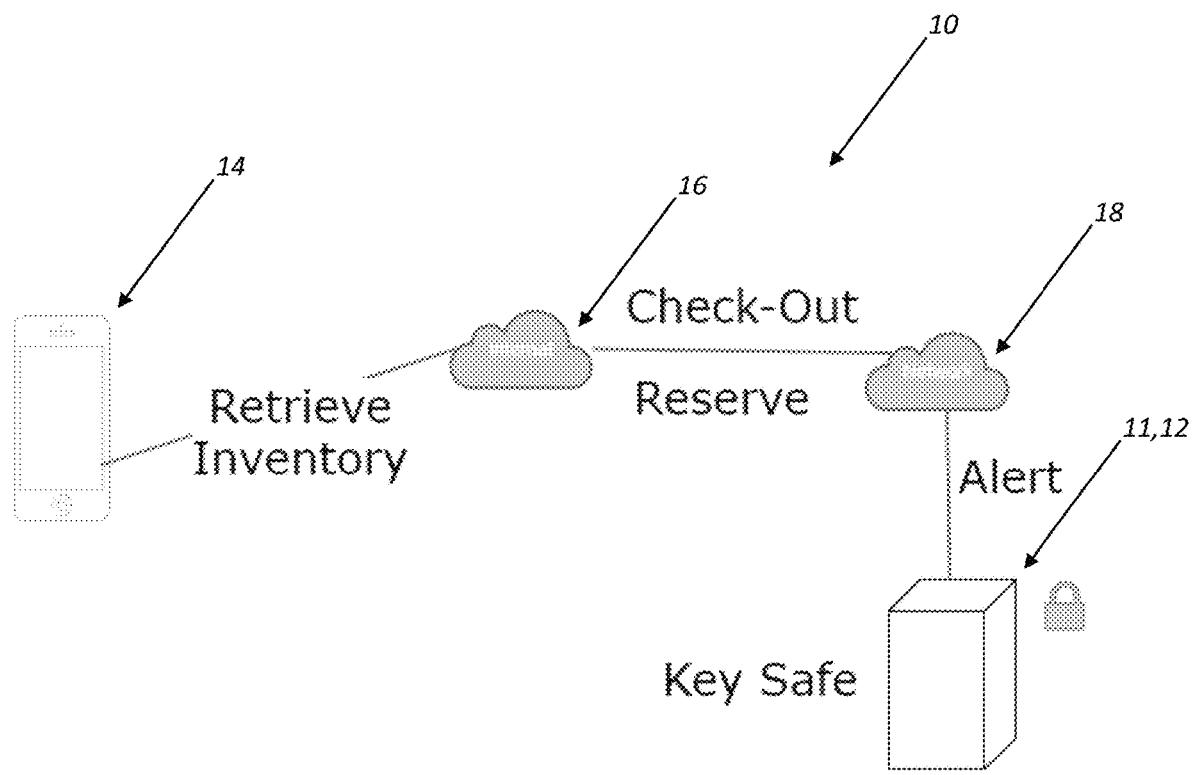
FIG. 1 is a schematic diagram illustrating one exemplary embodiment of the asset management system of the present invention.

Referring now specifically to FIG. 1, in one exemplary embodiment, the asset management system 10 of the present invention allows a key/key fob (or other asset) 11 to be located, reserved, retrieved, tracked, and/or returned to/from a remote storage device 12 using a mobile application executed on a mobile device 14 or the like through the Internet 16 and/or one or more public/private networks 18. Again, the asset management system 10 can be used by vehicle dealerships/rental agencies/repair shops, real estate offices/apartment complexes, etc. The asset management system 10 can also more broadly be used by any entity responsible for the storage and selective distribution of any asset 11 that must be accounted for and tracked, like a key/key fob 11.

In operation, a user first opens the mobile application on their mobile device 14. The user can search for a desired key/key fob/asset 11 and determine if it is available for retrieval from the remote storage device 12. Once a desired key//key fob/asset 11 is located and selected by the user, it can be reserved for checkout at present or at a future day/time. Optionally, a reason for checkout may be input by the user into the mobile application and recorded. This reservation may be coordinated with other reservations stored in a master calendar resident in a controller/server or the like coupled to the remote storage device 12 and/or the network 18. The controller/server may form part of a system kiosk 12 coupled to the remote storage device 12 and/or the network 18. At this point, the user can confirm the key//key fob/asset 11 to be checked out and send a request to the remote storage device 12. Again, this request is processed through the appropriate (wireless) network 18, the access controller, and the remote storage device 12. Appropriate logic and memory storage are provided to authenticate all users, complete all actions, and log all transactions. The user can then log into the remote storage device 12 (if not already logged in through the mobile application) and physically retrieve the requested key/key fob/asset 11. This process may essentially be reversed for return of the key/key fob/asset 11 to the remote storage device 12.

Advantageously, the mobile application provides for a smart search of keys/key fobs/assets 11, continually updated based on key//key fob/asset presence/absence, and provides full tracking capability based on user, day/time, etc. The mobile application works with any Wi-Fi and/or voice/data network, as with any conventional mobile application. QR code activation is also contemplated, as described in greater detail herein below. Finally, SMS notifications can also be delivered to other users related to a given key//key fob/asset status in general.

In general, users are able to complete the following tasks:

QR code activation of each user;
Review inventory of the box 12;
Review information related to a specific asset 11;
Notify a user that has an asset 11 out via SMS/Email that the someone else needs it;
Checkout or reserve an asset 11;
VIN scanning to add a vehicle with an associated key/key fob 11 into the system 10, for example;
VIN scanning to correspondingly remove a vehicle from the system 10; and
Vehicle detailed information lookup.

Figure 2:
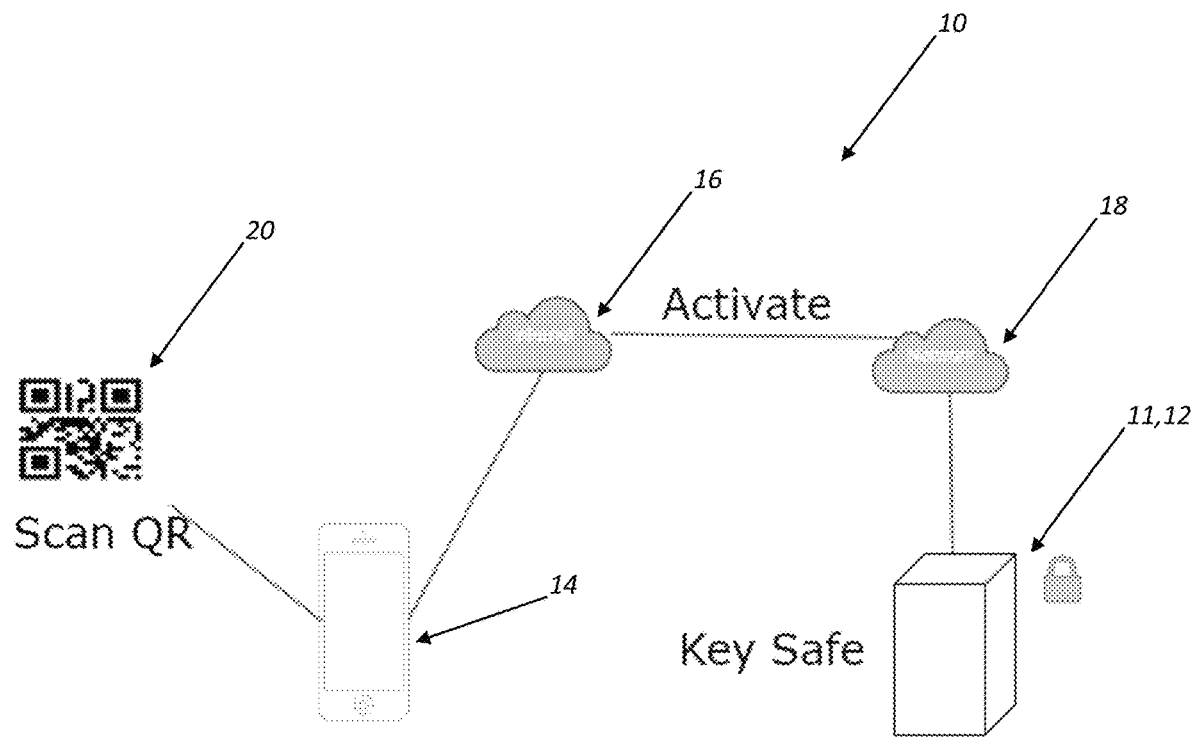
FIG. 2 is a schematic diagram illustrating another exemplary embodiment of the asset management system of the present invention.

Setup—QR Code Activation. Referring now specifically to FIG. 2, in another exemplary embodiment, a user of the asset management system 10 must be given permission from an administrator to use the mobile application. The user downloads the mobile application from either the Apple or Google app stores, for example, to their mobile device 14. The user then logs into the asset management system 10 and is presented an option to activate a mobile device 14. To activate, the user must then open the mobile application on their mobile device 14 and scan a QR code 20 that is provided by the kiosk 12. Thus, the user, mobile application, and/or mobile device 14 are recorded and authorized to use the asset management system 10. All mobile application interactions are optionally password and/or biometrically protected via an algorithm resident on the mobile device 14, at the controller/server, etc.

Figure 3:
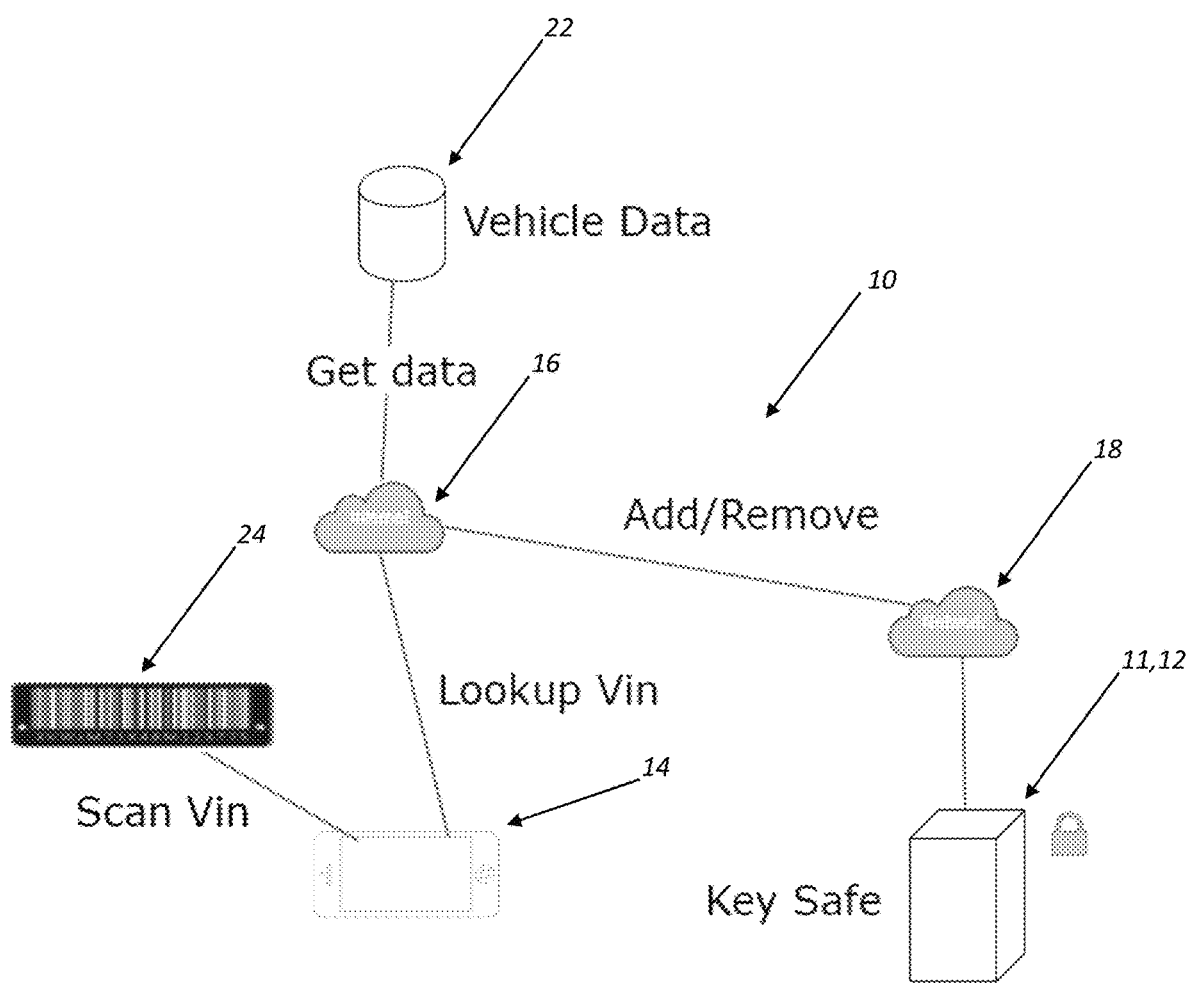
FIG. 3 is a schematic diagram illustrating a further exemplary embodiment of the asset management system of the present invention.

Review Inventory of the Box 12. Referring now specifically to FIG. 3, in a further exemplary embodiment, once activated, a user can view, search, and scroll through a list of assets 11. They can determine which assets 11 are available and, if not available, who has a given asset 11 out or who has it reserved and for when. This information is stored in an appropriate data repository 22.

Review Information Related to a Specific Asset 11. The mobile application shows key attributes related each asset 11. In the case of a vehicle, information like year, make, model, interior color, exterior color, and name are all available to the user.

Notify a User That Has a Key/Key Fob/Asset 11 Out Via SMS/Email That Someone Needs It. When an asset is not available, the mobile application can send an alert to the user that has the asset 11. This alert can be sent via SMS that will notify the user that has the asset 11 out that the current user is looking for it, for example.

Checkout or Reserve an Asset 11. For assets that are available, the user can check out or reserve the asset 11 remotely. This will ensure that the asset 11 is available when the user gets to the remote storage device 12. No one else can check out these assets 11 for a short period of time, for example.

VIN Scanning 24 to Add a Vehicle Into the System 10. The mobile application uses the built in camera of the mobile device 14 to scan a VIN barcode 24, for example. The VIN barcode 24 is then processed with industry data to return data about the vehicle, where the vehicle is associated with a key/key fob 11 present in the remote storage device 12. Part of this data is loaded into the mobile application automatically to assist the user in capturing the information on the mobile device 14. The user can adjust data as needed and then save the vehicle into the system 10, for example. The VIN barcode 24 is then used to pull up the asset 11 and the user is allowed to select it for removal from the system 10.

Figure 4:
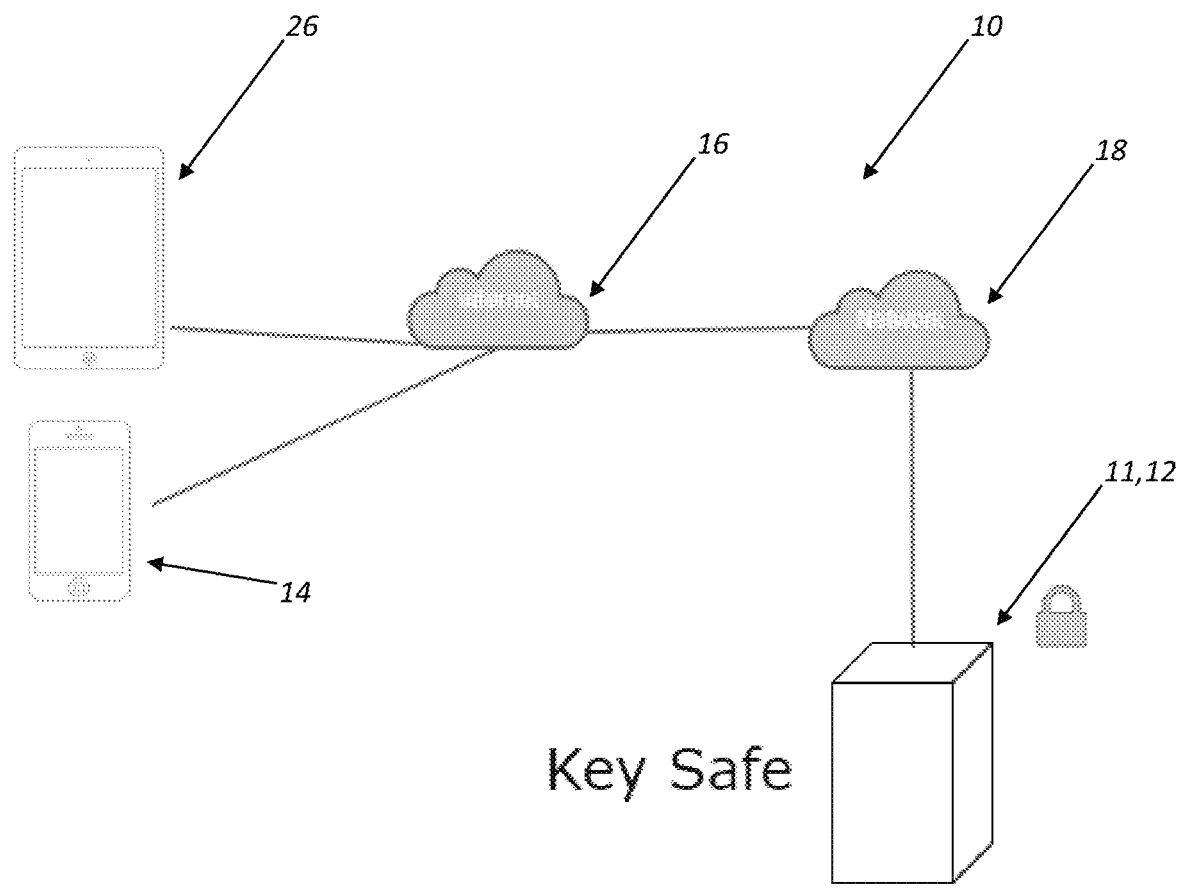
FIG. 4 is a a schematic diagram illustrating a still further exemplary embodiment of the asset management system of the present invention.

FIG. 4 illustrates an additional user with a mobile tablet 26 or the like coupled to the asset management system 10.

All users must have access to the kiosk 12 to setup the mobile application to access information from the asset management system 10. Transmission of data is encrypted via https to the kiosk 12 from the mobile devices 14, etc.

Again, the kiosk 12 generates unique QR codes 20 for each user. A user logs into the system 10 and activates the mobile application by using an integrated QR scanner on the mobile application to read to the QR code 20 on the kiosk 12 for that user. The user is then activated to that one device 12 and special API security info for that device 12 and user and are stored locally on the mobile device 14.

The mobile application uses information obtained from the QR code 20 to locate and authenticate the kiosk 12 on the Internet 16. The kiosk 12 allows communication over a secure http protocol on port 443 (this port can be configured). Each time the mobile application opens and with each request it makes, it must authenticate back to the controller/server prior to receiving information using the information from the QR code 20.

The user can filter and navigate the list to notify the user about a vehicle that they need, check out/reserve a vehicle, add/remove a vehicle, or get detailed information. For each of these options, the mobile application authenticates over secure http to a web service on the kiosk 12 or separate controller/server in a larger system 10 and then the kiosk 12 performs the requested operation. The web service communicates with a local relational database (SQL server) to retrieve and update data on the vehicle. Also, with a third party system to retrieve information based on a VIN number 22. The system 10 employs a VIN barcode reader that integrates with the mobile phone's camera to scan and read VIN barcodes 22. This information is passed to a third party to retrieve details on the vehicle.

The most unique parts of the system are the way the application activates the user and a device without any user setup required. Also, the timed reservation mechanisms (check out and reserve) that puts a hold on the asset to allow the user to retrieve the key after remotely selecting it. Another observation is that typically one sees these as a single user system per kiosk and this allows for more than one user at a time to access the system. The ability to remotely see in the box is somewhat unique for a user of this system, as well as the ability to see in the box for admins from home.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. An asset management system, comprising:
    a remote storage device coupled to a controller collectively configured to selectively retain an asset and selectively release the asset to an authorized user, wherein the remote storage device is configured to physically retain the asset among a plurality of like assets, wherein the asset is one of a physical key and a physical key fob for a vehicle; and
    a mobile device configured to execute a mobile application in communication with the controller via one or more networks, wherein the mobile application is operable for directing operation of the controller and the remote storage device;
    wherein the mobile application is operable for indicating the presence or absence of the asset and the plurality of like assets in or from the remote storage device to the authorized user;
    wherein the asset is one or more of the physical key and the physical key fob for the vehicle and the mobile application is operable for displaying status and attributes of the vehicle associated with the asset and not physically retained in the remote storage device to the authorized user via the mobile device, wherein the release of the asset to the authorized user is dependent upon the status and attributes of the vehicle; and
    wherein the mobile application is operable for messaging the authorized user through the mobile device to inform the authorized user that another authorized user has requested access to the asset from the remote storage device via another mobile device while the authorized user possesses the asset.

2. The asset management system of claim 1, wherein the mobile application is operable for directing the remote storage device to release the asset to the authorized user.

3. The asset management system of claim 1, wherein the mobile application is operable for allowing the authorized user to reserve release of the asset to the authorized user at a future time.

4. The asset management system of claim 1, wherein the mobile application is operable for informing the authorized user of an identity of another authorized user that has already removed the asset from the remote storage device.

5. The asset management system of claim 1, wherein the mobile device comprises a QR scanner operable for scanning a QR code and subsequently authorizing the authorized user.

6. The asset management system of claim 1, wherein the mobile device comprises a barcode scanner operable for scanning a barcode associated with the asset or a related asset.

7. An asset management method, comprising:
    providing a remote storage device coupled to a controller collectively configured to selectively retain an asset and selectively release the asset to an authorized user, wherein the remote storage device is configured to physically retain the asset among a plurality of like assets, wherein the asset is one of a physical key and a physical key fob for a vehicle; and
    providing a mobile device configured to execute a mobile application in communication with the controller via one or more networks, wherein the mobile application is operable for directing operation of the controller and the remote storage device;
    wherein the mobile application is operable for indicating the presence or absence of the asset and the plurality of like assets in or from the remote storage device to the authorized user
    wherein the asset is one or more of the physical key and the physical key fob for the vehicle and the mobile application is operable for displaying status and attributes of the vehicle associated with the asset and not physically retained in the remote storage device to the authorized user via the mobile device, wherein the release of the asset to the authorized user is dependent upon the status and attributes of the vehicle; and
    wherein the mobile application is operable for messaging the authorized user through the mobile device to inform the authorized user that another authorized user has requested access to the asset from the remote storage device via another mobile device while the authorized user possesses the asset.

8. The asset management method of claim 7, wherein the mobile application is operable for directing the remote storage device to release the asset to the authorized user.

9. The asset management method of claim 7, wherein the mobile application is operable for allowing the authorized user to reserve release of the asset to the authorized user at a future time.

10. The asset management method of claim 7, wherein the mobile application is operable for informing the authorized user of an identity of another authorized user that has already removed the asset from the remote storage device.

11. The asset management method of claim 7, wherein the mobile device comprises a QR scanner operable for scanning a QR code and subsequently authorizing the authorized user.

12. The asset management method of claim 7, wherein the mobile device comprises a barcode scanner operable for scanning a barcode associated with the asset or a related asset.

\* \* \* \* \*

UNITED STATES PATENT AND TRADEMARK OFFICE
CERTIFICATE OF CORRECTION

PATENT NO. : 10,580,242 B2  
APPLICATION NO. : 15/875430  
DATED : March 3, 2020  
INVENTOR(S) : Travis Ray et al.

Page 1 of 1

It is certified that error appears in the above-identified patent and that said Letters Patent is hereby corrected as shown below:

On the Title Page

Item (73) Correcting the spelling of the Assignees name:  
From: Macron International Inc.  
To: Marcon International Inc.

Signed and Sealed this  
Twenty-sixth Day of May, 2020

Andrei Iancu  
*Director of the United States Patent and Trademark Office*